J. R. THOMAS.
BLADE TRUING DEVICE.
APPLICATION FILED AUG. 1, 1910.

985,473.

Patented Feb. 28, 1911.
3 SHEETS—SHEET 1.

Witnesses

Inventor
John R. Thomas
Per Small & Small
Attorneys

J. R. THOMAS.
BLADE TRUING DEVICE.
APPLICATION FILED AUG. 1, 1910.
985,473.
Patented Feb. 28, 1911.
3 SHEETS—SHEET 2.
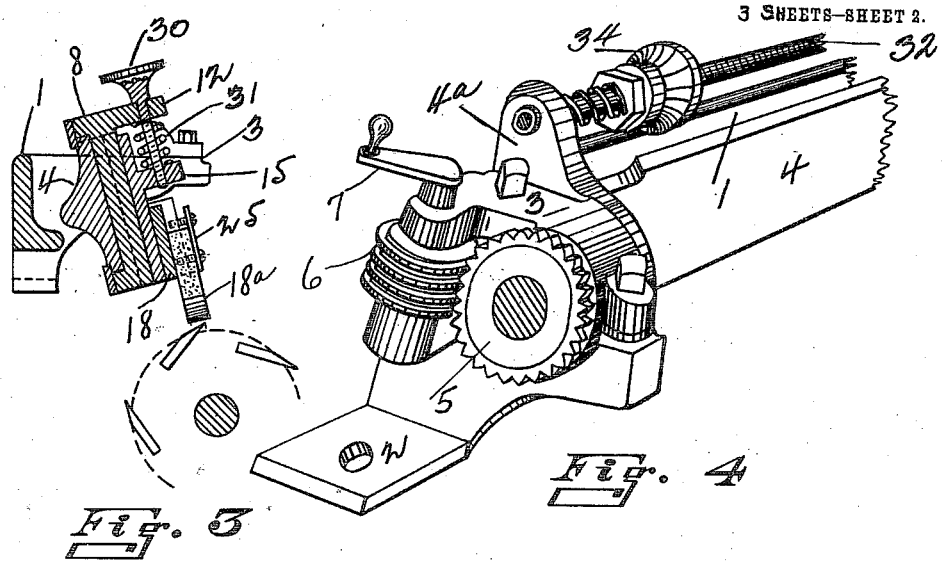
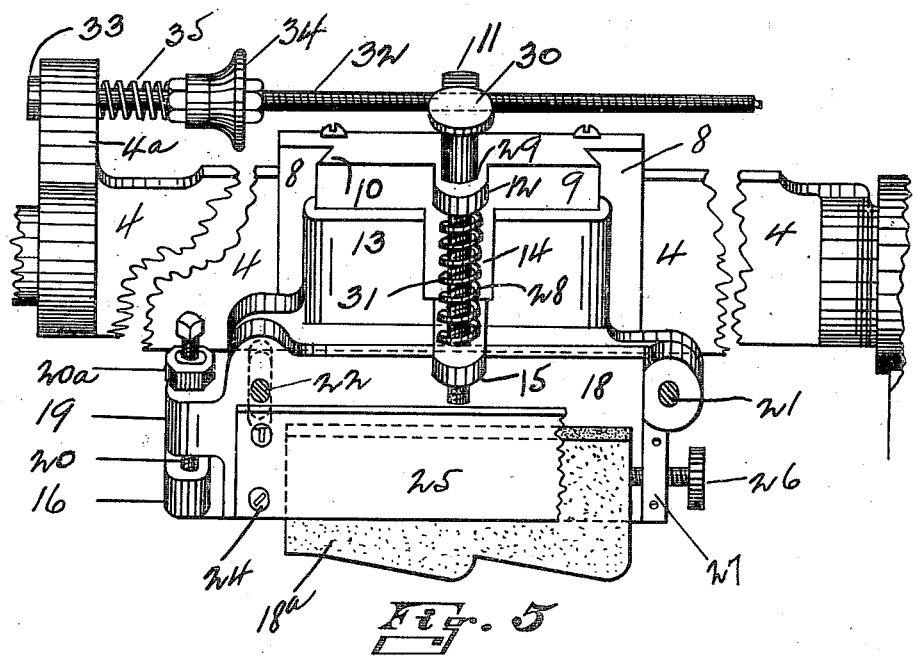
Witnesses
O. M. Hance
Frank J. Quarterman
Inventor
John R. Thomas
Per Small ~ Small
Attorneys

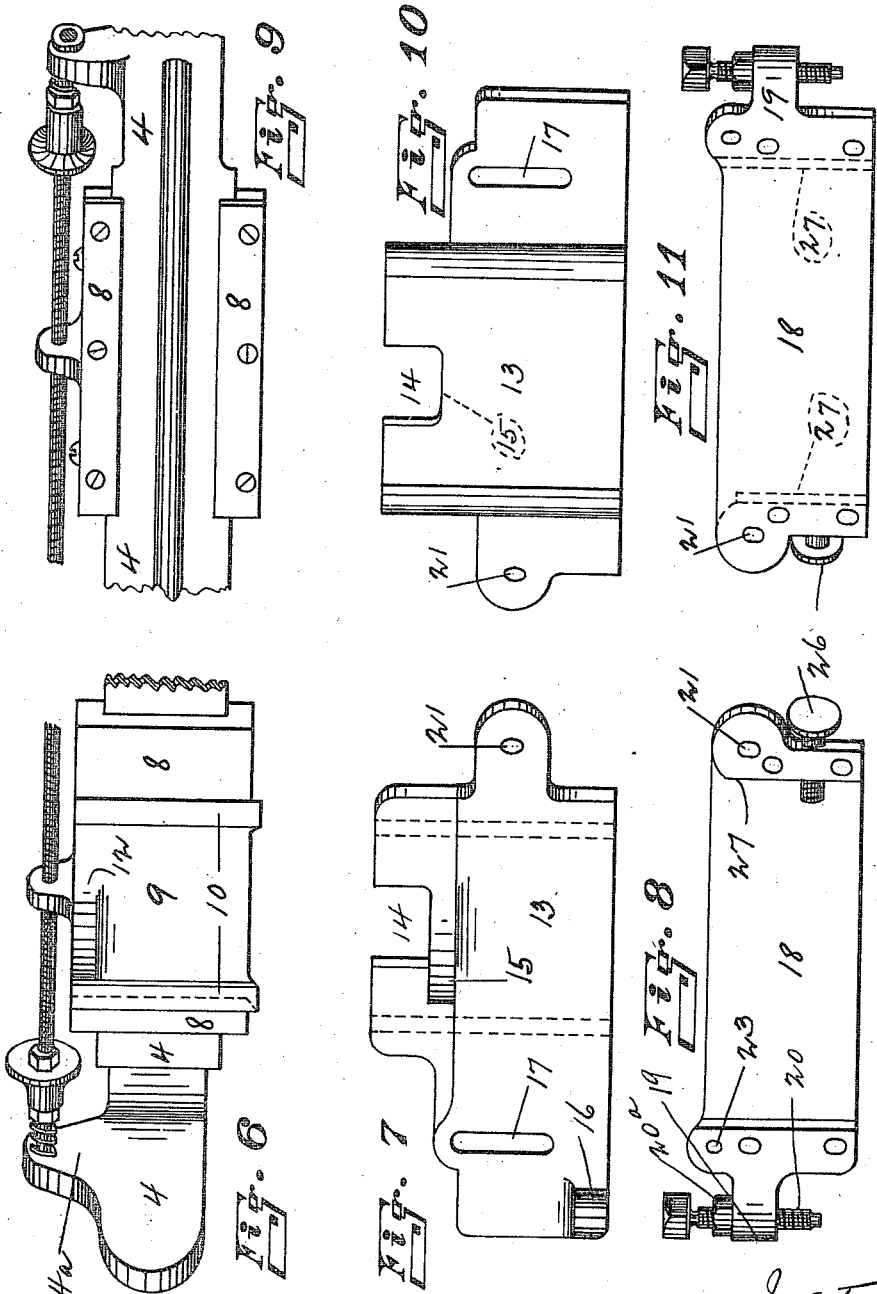

UNITED STATES PATENT OFFICE.

JOHN R. THOMAS, OF ST. LOUIS, MISSOURI, ASSIGNOR TO HALL & BROWN WOODWORKING MACHINE CO., OF ST. LOUIS, MISSOURI.

BLADE-TRUING DEVICE.

985,473.  Specification of Letters Patent.  Patented Feb. 28, 1911.

Application filed August 1, 1910. Serial No. 574,933.

*To all whom it may concern:*

Be it known that I, JOHN R. THOMAS, a citizen of the United States, residing at St. Louis, in the State of Missouri, have invented a new and useful Blade-Truing Device, of which the following is a specification.

My invention relates to improvements in the means of grinding or " truing " the series of knives or " cutters " disposed in the rotating holder or cutter-head employed in that type of wood-working machine termed a "planer."

Among others, the objects of the inventions aforesaid are (*a*) to provide a simple, detachable, and adjustable device by means of which the entire cutting edge of each of the series of blades is ground or "trued" simultaneously, in contra-distinction to those devices in which said cutting edge contacts with a traveling stone and is, in consequence, ground first at one point and then at another; (*b*) to prevent the "burning" or glazing of the truing stone; and (*c*) to provide means whereby said stone may be minutely leveled relative to the edge of the blades to be acted upon.

Other objects and advantages may be noted in the following specification and its claims.

Like numerals refer to like parts throughout the accompanying drawings, in which—

Figure 1:
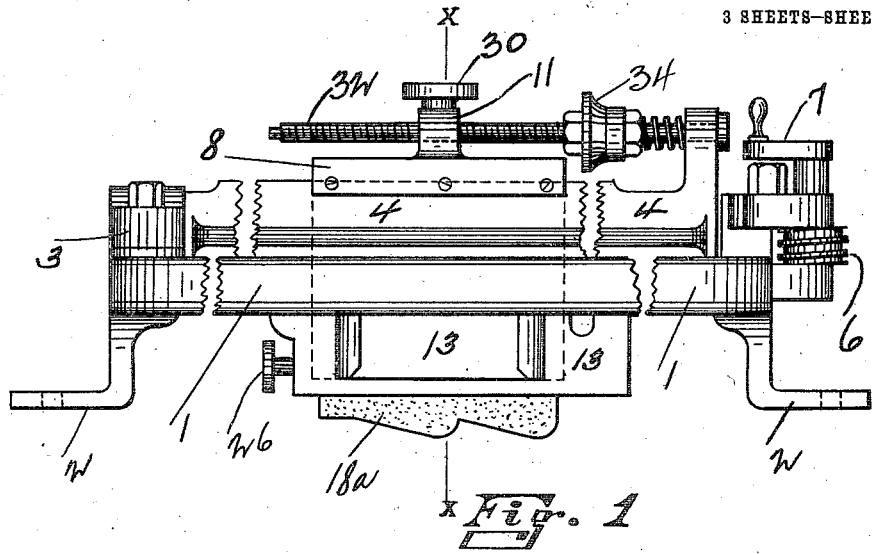
Figure 2:
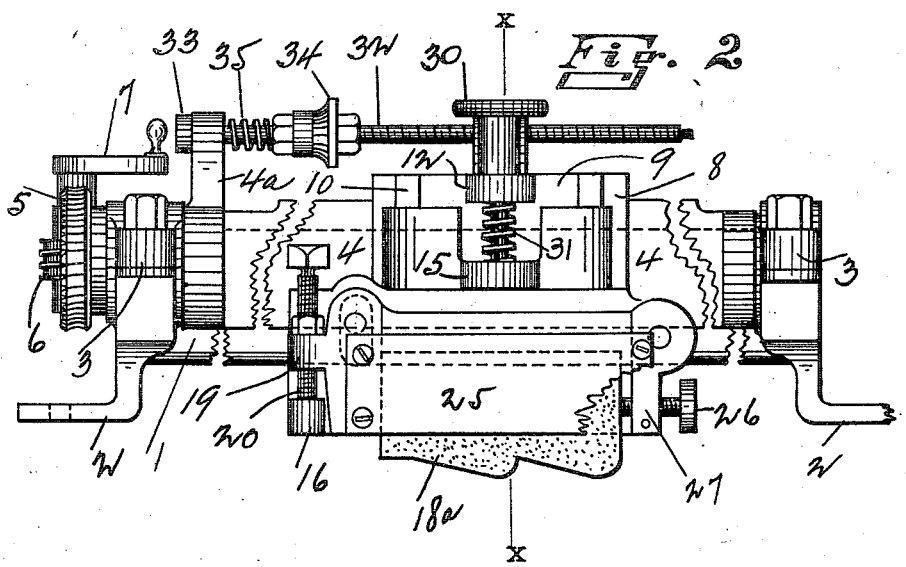

Figure 1 is an elevation, taken from the rear, of my completed device; Fig. 2 the reverse of Fig. 1; Fig. 3 a cross-section along line *x—x* of Figs. 1 and 2, embracing a diagrammatic cross-section of a "cutter-head" and its "cutters"; Fig. 4 a perspective depicting a worm and worm gear of my device, and a section of a frame of the latter and its relation to said worm and gear; Fig. 5 a repetition of Fig. 2, taken from above in order to better depict the correlation of certain parts; Figs. 6, 7 and 8 elevations in perspective of certain correlated parts of my invention; and Figs. 9, 10 and 11 the reverse of Figs. 6, 7 and 8.

In wood-planers as the lumber emerges from its treatment in the body of the machine it encounters a series of knives termed "cutters" which are being very rapidly rotated in a holder or "cutter-head", the latter being fixed upon a shaft or axle pillowed in opposite projections of the frame of the planer proper. The edge of said "cutters" is given the outline which it is desired to impart to the lumber, and hence it is necessary to the accomplishment of perfect work that each of the series of "cutters" be "trued" or ground identically alike in order that each may strike the lumber to the same depth and assume an equal share of the burden imposed. Again, it is desirable to be able to move the truing stone either into or out of contact with the revolving "cutters", and the means for accomplishing this should be capable of automatically yielding where the operator lowers the stone too near the "cutters", otherwise the contact is too severe and the edge of the blades may be damaged or ground too much or too rapidly. And further, it happens not uncommonly that a workman may neglect or be unable to set the stone perfectly "square" or level in its holder, in consequence of which one half of the edge of the "cutters" may be ground and the other half not contact with the stone at all. Therefore it is highly desirable to provide a means for minutely adjusting or leveling the stone so that its whole truing edge may be thrown evenly in contact with the "cutter" edge.

In the practice of my invention I provide a comparatively heavy and rigid supporting frame 1 having feet 2 which rest upon projections of the frame of the planer. Supported in bearings 3 at opposite inturned extremities of frame 1 is a secondary frame 4, upon an end of which is fixed a gear 5 which, in turn, engages the spirals of a worm 6 operated by crank 7. It is obvious that upon turning crank 7 gear 5 is caused to revolve and imparts a like motion to frame 4. Detachably and slidably mounted upon frame 4 is a carriage 8 whose external conformation, shown in Fig. 6, comprises a raised portion 9 defined by sharp, angular shoulders 10, the latter affording a "track" or guide, an upstanding apertured boss 11, and an outstanding apertured lug 12. Slidably engaging shoulders 10 of carriage 8 is a plate 13 whose external conformation, shown in Fig. 7, comprises an aperture 14, designed for the reception of lug 12 of carriage 8, a threaded lug 15 in register with lug 12, a solid boss 16 serving as a bearing surface, and an elongated slot 17. Over and upon the lower half of plate 13 is disposed an adjustable stone-holder 18, having a lug 19 through which works screw 20, provided with nut 20ª, to find a bearing upon the top of boss 16. Holder 18, shown in Figs. 8 and 11, is pivoted at 21 to plate 13 and said plate and holder are normally locked together by a bolt 22 directed through elongated slot 17 of plate 13 and threaded aperture 23 of holder 18. Obviously, it being found desirable to minutely adjust the stone, as aforementioned, bolt 22 is loosened, nut 20ª is worked upward, and screw 20 manipulated whereupon stone-holder 18 is raised or lowered upon pivot 21 with the greatest delicacy and precision and the plane of the stone so re-adjusted. Over the stone is fixed, by screws 24, a flat piece of steel 25 which assists set screw 26, laterally entering offset or shoulder 27 of holder 18, in maintaining the stone rigidly in place. Directed through the smooth aperture of lug 12 and engaging the threads of lug 15 is a screw 28, having a shoulder 29, finding a bearing upon the top of lug 12, and a cap 30, and about said screw and normally compressed by lugs 12 and 15 is a helical spring 31. Screw 28 vertically raises or lowers, at the will of the operator, plate 13 and, in consequence, the truing stone 18ª and its holder 18, and should said stone be lowered too closely to the revolving "cutters" the latter will automatically "push up" the stone and parts 18 and 13, although a constant and proper contact will be maintained between the stone and "cutters" through the resistance of spring 31. For the movement of carriage 8 upon rotative frame 4 there is provided a lengthy threaded rod 32, provided with cap 33, a rest 34 for the fingers of the mechanic, and a spring 35 simulating the function of spring 31. Said rod works freely in the smooth bored lug 4ª, rising from frame 4, while engaging the treaded aperture of boss 11 of carriage 8, and upon rotating member 34 to the right or left carriage 8 and its accompanying parts 13, 18, and 18ª are moved upon and toward one end or the other, as desired, of frame 4.

A feature of my invention to which I attach great importance is the ability to rotate the truing stone above the "cutters" while the same are being ground. The "cutter" edges are usually beveled and when newly inserted in the cutter-head present fine, knife-like edges, whereas the width of the truing edge of the stone approximates $\frac{6}{10}$ of an inch, and where in devices of this character the "cutter" edges are permitted to constantly contact with the stone at one and the same point the latter soon "burns" or glazes or becomes uneven and incapable of perfect work. These disadvantages I overcome by being able to cause the "cutters" to start upon the stone from one of the longitudinal edges of the latter and thence, gradually or rapidly, pass completely across its entire surface to the opposite longitudinal margin, whereupon the whole operation may be repeated by turning crank 7 in the reverse direction. Likewise, my invention of giving to the truing stone a design or pattern complementary to that of the "cutter" is highly valued, as thereby the entire edge of the latter is at once placed under the action of the stone, the truing accomplished most speedily, the work of the operator lessened, and no one part of the design of the cutters is in danger of being ground disproportionately to the other of its parts, the stone acting in the capacity of a mold or pattern.

While I have hereinbefore described my invention in its application to the "cutters" of a wood-planer, yet I do not wish to be understood as thereto confining said invention, and the right is reserved not only to use it in connection with other and different machines and to make such minor modifications therein as may from time to time be found necessary or convenient, but to substitute for the truing stone other and different articles or tools for other and different purposes.

What I claim as new and desire to secure by Letters-Patent is:—

1. A blade truing device comprising a grinding stone, a stone-holder, a movable frame supporting said holder, members actuating said frame, and mechanism effecting reciprocal rotation of said stone across the line of contact therewith of the blades to be trued, whereby the latter are caused to progress from one to the other of the longitudinal margins of the truing edge of said stone, substantially as and for the purposes described.

2. A blade truing device comprising a grinding stone, a stone-holder, a movable frame supporting said holder, members actuating said frame, means for minutely leveling said stone relative to the edge of the blades to be trued, and mechanism effecting reciprocal rotation of said stone across the line of contact therewith of said blades, whereby the latter are caused to progress from one to the other of the longitudinal margins of the truing edge of said stone, substantially as and for the purposes described.

3. A blade truing device comprising a grinding stone, a stone-holder, a movable frame supporting said holder, members actuating said frame, means whereby the impact of the blades against said stone is yieldingly resisted, and mechanism effecting reciprocal rotation of said stone across the line of contact therewith of said blades, whereby the latter are caused to progress from one to the other of the longitudinal margins of the truing edge of said stone, substantially as and for the purposes described.

4. A blade truing device comprising a grinding stone, a stone-holder, a movable frame supporting said holder, members actuating said frame, means for the positive horizontal and vertical movement of said stone, and mechanism effecting reciprocal rotation of said stone across the line of contact therewith of the blades to be trued, whereby the latter are caused to progress from one to the other of the longitudinal margins of the truing edge of said stone, substantially as and for the purposes described.

5. A blade truing device comprising a grinding stone, a stone-holder, a movable frame supporting said holder, members actuating said frame, means whereby said stone may be minutely leveled relative to the edge of the blades to be trued, means whereby the impact of said blades against said stone is yieldingly resisted, and mechanism effecting reciprocal rotation of said stone across the line of contact therewith of said blades, whereby the latter are caused to progress from one to the other of the longitudinal margins of the truing edge of said stone, substantially as and for the purposes described.

6. A blade truing device comprising a grinding stone, a stone-holder, a movable frame supporting said holder, members actuating said frame, means whereby said stone may be minutely leveled relative to the edge of the blades to be trued, means for the positive horizontal and vertical movement of said stone, and mechanism effecting reciprocal rotation of said stone across the line of contact therewith of said blades, whereby the latter are caused to progress from one to the other of the longitudinal margins of the truing edge of said stone, substantially as and for the purposes described.

7. A blade truing device comprising a grinding stone, a stone-holder, a movable frame supporting said holder, members actuating said frame, means whereby the impact of the blades against said stone is yieldingly resisted, means for the positive horizontal and vertical movement of said stone, and mechanism effecting reciprocal rotation of said stone across the line of contact therewith of said blades, whereby the latter are caused to progress from one to the other of the longitudinal margins of the truing edge of said stone, substantially as and for the purposes described.

8. A blade truing device comprising a grinding stone, a stone-holder, a movable frame supporting said holder, members actuating said frame, means whereby the impact of the blades against said stone is yieldingly resisted, means for the positive horizontal and vertical movement of said stone, means whereby said stone may be minutely leveled relative to the edge of said blades, and mechanism effecting reciprocal rotation of said stone across the line of contact therewith of said blades, whereby the latter are caused to progress from one to the other of the longitudinal margins of the truing edge of said stone, substantially as and for the purposes described.

JOHN R. THOMAS.

Witnesses:
   C. Aug. Grote,
   Frank J. Quertermus.